United States Patent [19]

Jones et al.

[11] Patent Number: 4,908,054
[45] Date of Patent: Mar. 13, 1990

[54] METHOD FOR MAKING INFRARED POLARIZING GLASSES

[75] Inventors: Kelly E. Jones, Salt Lake City, Utah; Frederick E. Noll, Horseheads, N.Y.

[73] Assignee: Corning Incorporated, Corning, N.Y.

[21] Appl. No.: 312,678

[22] Filed: Feb. 21, 1989

[51] Int. Cl.$^4$ ......................... C03C 3/26; C03C 23/00
[52] U.S. Cl. ................................. 65/30.11; 65/32.3; 501/13
[58] Field of Search .................. 65/30.11, 32, 32.3; 501/13

[56] References Cited

U.S. PATENT DOCUMENTS

| | | | |
|---|---|---|---|
| 3,653,863 | 4/1972 | Araujo et al. | 65/30.11 |
| 3,892,582 | 7/1975 | Simms | 65/30.11 X |
| 4,190,451 | 2/1980 | Hares et al. | 65/30.11 X |
| 4,304,584 | 12/1981 | Borrell et al. | 65/32 X |
| 4,390,592 | 6/1983 | Ernsberger | 65/32 X |
| 4,479,819 | 10/1984 | Borrelli et al. | 65/30.11 |
| 4,486,213 | 12/1984 | Lentz et al. | 65/30.11 |
| 4,549,795 | 10/1985 | Simms | 65/30.11 X |

Primary Examiner—Robert L. Lindsay
Attorney, Agent, or Firm—Clinton S. Janes, Jr.

[57] ABSTRACT

This invention is directed to the preparation of glass articles exhibiting a relatively broad band of high contrast polarizing properties in the infrared region of the radiation spectrum from glasses containing silver halide particles selected from the group consisting of AgCl, AgBr, and AgI. The inventive method comprises the following five general steps:

(a) melting a batch for a glass containing silver and at least one halide selected from the group consisting of chloride, bromide, and iodide;
(b) cooling and shaping said melt into a glass article of a desired configuration;
(c) subjecting said glass article to a temperature at least above the strain point, but not in excess of 75° C. above the softening point of the glass, for a sufficient length of time to cause the generation of silver halide particles therein selected from the group consisting of AgCl, AgBr, and AgI, said particles ranging in size between about 200–5000 Å;
(d) elongating said glass article under stress at a temperature above the annealing point, but below that where said glass exhibits a viscosity of about $10^8$ poises, such that said silver halide particles are elongated to an aspect ratio of at least 5:1 and aligned in the direction of the stress; and, thereafter,
(e) exposing said elongated glass article to a reducing environment at a pressure greater than atmospheric pressure and at a temperature above about 250° C., but no higher than about 25° C. above the annealing point of the glass, for a period of time sufficient to develop a reducing surface layer on said glass article having a thickness of at least 10 microns wherein at least a portion of said elongated silver halide particles are reduced to elemental silver particles having aspect ratios greater than 2:1 which are deposited in and/or upon said elongated particles.

10 Claims, 1 Drawing Sheet

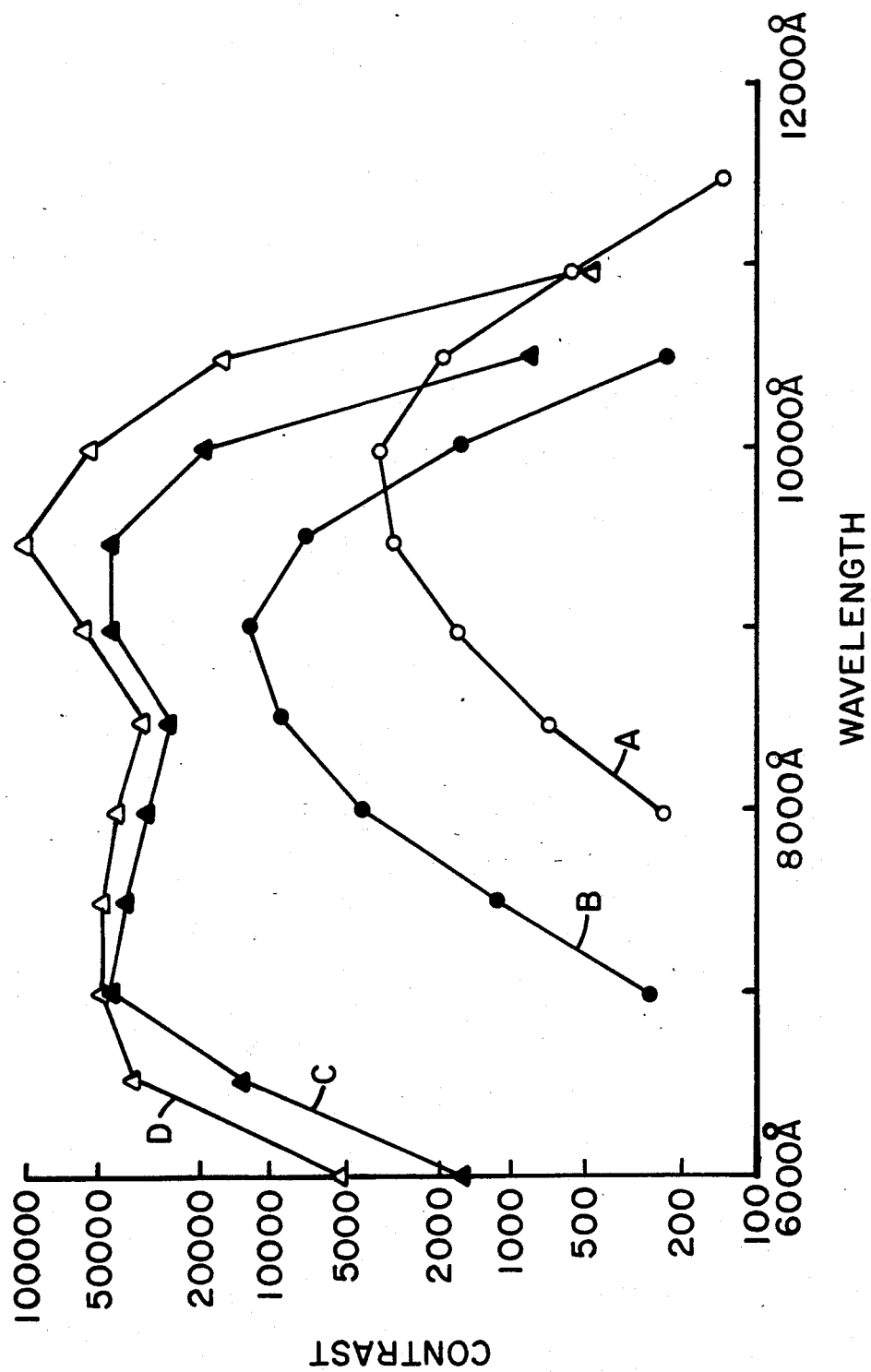

METHOD FOR MAKING INFRARED POLARIZING GLASSES

BACKGROUND OF THE INVENTION

U.S. Pat. No. 4,479,819 describes the preparation of glass articles exhibiting excellent polarization in the infrared region of the radiation spectrum from glasses containing particles of silver halide dispersed therein, the silver halide being selected from the group consisting of AgCl, AgBr, and AgI. The method disclosed comprised four basic steps:

(1) a batch for a glass containing silver and at least one halide selected from the group consisting of chloride, bromide, and iodide was melted and the melt shaped into a glass body of a desired configuration;

(2) that glass body was subjected to a heat treatment at a temperature at least above the strain point of the glass, but not in excess of 50° C. above the softening point of the glass, for a period of time sufficient to cause the generation of silver halide particles therein selected from the group consisting of AgCl, AgBr, and AgI ranging in size between about 200–5000 Å; thereafter (3) the glass body was elongated under stress at a temperature above the annealing point of the glass, but below the temperature at which the glass demonstrates a viscosity of about $10^8$ poises, such that the silver halide particles were elongated to an aspect ratio of at least 5:1 and aligned in the direction of the stress; and then (4) the elongated glass body was exposed to a reducing atmosphere at a temperature above about 250° C., but no higher than about 25° C. above the annealing point of the glass, for a period of time sufficient to develop a reduced surface layer on the glass article having a thickness of at least 10 microns ($\approx 0.0004''$) and, preferably, about 50 microns ($\approx 0.002''$), wherein at least a portion of the elongated silver halide particles was reduced to elemental silver particles having aspect ratios greater than 2:1 which were deposited in and/or upon the elongated particles.

The principal objective of the invention disclosed in that patent was to produce glass articles displaying excellent polarizing properties over the infrared portion of the radiation spectrum, most preferably within the region of 700–3000 nm (7000–30,000 Å), but also up to longer wavelengths, e.g., 3 to 5 microns.

As was explained in the patent, the dichroic ratio is defined as the ratio existing between the absorption of radiation parallel to the direction of elongation and the absorption of radiation perpendicular to the direction of elongation; the sharper (taller and narrower) the peaks, the higher the dichroic ratio. Sharp peaks occur with the presence of relatively small particles. Nevertheless, the patent cautions that the particles must not be too small; with particles smaller than about 100 Å, the mean-free-path limitations to the conduction electrons cause the peak to broaden. Moreover, small particles demand very high elongation stresses to develop the necessary aspect ratio. And, because the likelihood of glass body breakage during a stretching-type elongation process is directly proportional to the surface area of the body under stress, there is a very practical limitation as to the level of stress than can be applied to a glass sheet or other body of significant bulk. In general, a stress level of a few thousand psi has been deemed to comprise a practical limit.

It was emphasized that the heat treating parameters of Steps (2), (3), and (4) were critical to securing the desired properties in the final product. To illustrate:

The growth of silver halide particles cannot occur at temperatures below the strain point of the glass because the viscosity of the glass is too high. Therefore, crystallization temperatures above the annealing point are preferred and, where physical support is provided for the glass body, temperatures up to 50° C. above the softening point of the glass can be employed.

Elongation of the glass body, along with the silver halide particles grown in Step (2), will be carried out at temperatures above the annealing point of the glass, but below the softening point thereof. Thus, a temperature at which the glass exhibits a viscosity of about $10^8$ poises had been adjudged to constitute the maximum. Customarily, the elongation process will be conducted at temperatures at least 50° C. below the softening point of the glass to permit high stresses to be developed and to inhibit respheroidization of the silver halide particles.

Laboratory investigations indicated that silver halide particles can be elongated at lower stresses than metallic silver particles, but yet will provide excellent polarization characteristics after reduction to elemental or metallic silver. Nonetheless, firing of the elongated body in a reducing environment under atmospheric conditions will be undertaken at temperatures above 250° C., but no higher than 25° C. above the annealing point of the glass, and, preferably, somewhat below the annealing point of the glass, to prevent any proclivity of the particles to respheriodize.

Finally, experience had demonstrated that the silver halide crystals generated during the initial heat treatment [Step (2)]ought to have diameters of at least about 200 Å in order to assume, upon elongation, aspect ratios of at least 5:1 such that, upon reduction to elemental silver particles, those latter particles will display aspect ratios greater than 2:1, thereby assuring the placement of the long wavelength peak at least near the edge of the infrared region of the radiation spectrum, while avoiding serious breakage problems during the subsequent elongation step. At the other extreme the diameters of the initial silver halide particles ought not to exceed about 5000 Å in order to preclude the development of significant haze in the glass accompanied with a decreased dichroic ratio resulting from radiation scattering effects.

Laboratory investigations and field experience have evidenced that one of the key measures of the effectiveness of the above-described polarizing bodies is the contrast ratio, or as referred to simply in the art as contrast. Contrast comprises the ratio of the amount of radiation transmitted with its plane of polarization perpendicular to the elongation axis to the amount of radiation transmitted with its plane of polarization parallel to the elongation axis. In general, the greater the contrast, the more useful (and, hence, more valuable) the polarizing body.

Another important feature of a polarizing body is the bandwidth over which it is effective. The polarizing glass articles produced in accordance with the description of the above patent tend to have a rather narrow band over which the contrast is at a maximum. Thus, on either side of that peak wavelength the contrast falls off quite sharply.

Laboratory experimentation has indicated that the level of contrast attainable in the polarizing glass bodies prepared in accordance with the above patent is dependent upon, among other things, the amount of reduction occurring during Step (4), i.e., during the reduction firing step. Typically, the greater the extent of reduction, the greater the level of contrast. It has been demonstrated that contrast can be increased by employing higher reducing firing temperatures and/or longer periods of firing. That practice is limited, however, inasmuch as higher temperatures and/or longer exposure times lead to respheroidization of the silver halide particles wherein the elongated particles shrink and/or break apart, thereby tending to form spheres. Such respheroidization can result in a decrease in contrast and/or a narrowing of the peak absorption band or a shifting of the peak absorption band in the direction of shorter wavelengths. To illustrate, the "standard" process for preparing polarizing glass articles according to the above patent has utilized firing in a hydrogen atmosphere for four hours at 425° C. When the glass articles were fired for seven hours in a hydrogen atmosphere at 425° C., the contrast exhibited by the articles was increased somewhat, but with a concurrent reduction in the bandwidth of high contrast.

Consequently, the primary objective of the present objective of the present invention was to prepare infrared polarizing glass bodies of higher contrast and greater bandwidth than those produced in U.S. Pat. No. 4,479,819.

A second objective of the present invention was to produce infrared polarizing glass bodies exhibiting high contrast over a relatively broad bandwidth utilizing shorter exposure periods to reduction firing than required in the method of U.S. Pat. No. 4,479,819.

SUMMARY OF THE INVENTION

The inventive process described below achieves those objectives. It permits the manufacture of infrared polarizing glass bodies wherein the degree of contrast is limited only by the intrinsic properties of the glass composition, rather than by the level of reduction possible before respheroidization of the silver halide particles occurs.

In broadest terms, the inventive process contemplates carrying out Step (4), i.e., the reduction firing step, in a pressurized reducing atmosphere, instead of the conventional practice of firing at normal atmospheric pressure. The process creates a much higher degree of reduction in the glass than when fired at atmospheric pressure for equivalent times and temperatures. Because of that phenomenon, high contrast can be obtained without hazarding the onset of respheroidization. A further benefit flowing from the inventive process is the broadening of the effective bandwidth over which the polarizing action of the glass is operable, thereby further enhancing the value of the glass. Whereas the use of a hydrogen atmosphere provides the most efficient means to achieve the desired reducing surface layer on the glass, to decrease the hazards inherent in the use of a pure hydrogen atmosphere, a mixture of hydrogen with an inert gas, e.g., forming gas consisting of about 92% nitrogen and 8% hydrogen, can be employed. Other reducing gases, such as carbon monoxide and cracked ammonia, can be effective, but commonly require higher pressures and/or longer firing periods than hydrogen-containing atmospheres.

Whereas any increase in pressure over conventional atmospheric pressure conceivably can exert a positive effect upon the reduction step, we have found that a minimum over pressure of at least about one atmosphere is necessary to assure a significant enhancement in contrast and broadening of bandwidth, and a decrease in the extent of time involved in the reduction step. The maximum operable pressure is governed only by the equipment utilized or the mechanical strength of the glass body. High pressures can reduce the time required and may permit the use of lower firing temperatures. It will be appreciated, nevertheless, that at the point at which the glass surface becomes saturated with hydrogen, no further increase in the rate of reduction can be expected with increased pressure.

In like manner to U.S. Pat. No. 4,479,819, the present inventive method is operable with phase separable or photochromic glasses of widely varying compositions. One preferred area of photochromic glasses is encompassed within U.S. Pat. No. 4,190,451 and consists essentially, expressed in terms of weight percent on the oxide basis, of 6–20% $R_2O$, wherein $R_2O$ consists of 0–2.5% $Li_2O$, 0–9% $Na_2O$, 0–17% $K_2O$, and 0–6% $Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, the molar ratio $R_2O:B_2O_3$ ranging between 0.55–0.85, where the composition is essentially free from divalent metal oxides other than CuO, and the weight ratio Ag:(Cl+Br) ranging about 0.65–0.95. Two areas of preferred phase separable glasses have the same base composition as that immediately above except that either the composition is essentially free of CuO or the composition contains CuO but the molar ratio $(R_2O-Al_2O_3):B_2O_3 < 0.25$.

Another particularly preferred base composition system of phase separable glasses which contain silver halide particles and copper consists essentially, expressed in terms of weight percent on the oxide basis, of 5–12% alkali metal oxides, 27–35% $B_2O_3$, 1–15% $Al_2O_3$, and the remainder $SiO_2$. A most preferred glass from that system consisted essentially, expressed in terms of parts by weight on the oxide basis, of:

| $SiO_2$ | 51.8 | $Na_2O$ | 9.8 | Br | 1.2 |
|---|---|---|---|---|---|
| $B_2O_3$ | 31.0 | Ag | 0.18 | F | 1.2 |
| $Al_2O_3$ | 7.8 | Cl | 0.52 | CuO | 0.03 |

A particularly preferred base composition system of photochromic glasses which contain silver halide particles and copper consists essentially, expressed in terms of weight percent on the oxide basis, of 5–12% alkali metal oxides, 27–35% $B_2O_3$, 1–15% $Al_2O_3$, 0.01% CdO, and the remainder $SiO_2$.

In summary, the present inventive method provides a product having a microstructure similar to those described in U.S. Pat. No. 4,479,819, but wherein the polarizing contrast demonstrated is greater and the bandwidth of polarizing action is broader, and those improved properties can be achieved in a shorter period of time at the same reduction firing temperature.

PRIOR ART

U.S. Pat. No. 4,479,819 reviewed at some length the disclosure of U.S. Pat. No. 4,304,584 and distinguished the two disclosures. The explanation presented in the former patent is equally valid in differentiating the present invention over that included within U.S. Pat. No. 4,304,584. The invention described in U.S. Pat. No. 4,479,819 was also found to be patentable over U.S. Pat. No. 3,653,863. Because the method of the present invention utilizes the general elements of the method disclosed in U.S. Pat. No. 4,479,819, it is equally distinguishable from the description provided in U.S. Pat. No. 3,653,863.

U.S. Pat. No. 4,479,819 referred to U.S. application Ser. No. 427,510, now U.S. Pat. No. 4,486,213, which was filed concurrently with the application that matured as U.S. Pat. No. 4,479,819. U.S. Pat. No. 4,486,213 disclosed a method for stretching a laminated glass sheet consisting of a core glass containing silver halide particles which is covered with a thin layer of cladding glass.

It is believed that U.S. Pat. No. 4,479,819 comprises the most pertinent prior art.

BRIEF DESCRIPTION OF THE DRAWING

The appended drawing presents curves illustrating polarization contrast and bandwidth of polarizing behavior as a function of wavelength illustrating the improvements resulting from the use of the method of the instant invention.

DESCRIPTION OF PREFERRED EMBODIMENTS

In investigating the parameters of the inventive method, samples of Corning 8111 glass in sheet form having dimensions of about $1'' \times 0.5'' \times 0.04''$ ($\approx 25.4 \times 12.7 \times 1$ mm) and exhibiting photochromic properties, were placed into an electrically-heated tube furnace which had been preheated to 425° C. That glass is marketed by Corning Glass Works, Corning, N.Y. under the trademark PHOTOGRAY EXTRA. The glass had a composition encompassed within U.S. Pat. No. 4,190,451 and the sheet had been drawn as described in U.S. Pat. No. 4,479,819 to produce silver halide particles having a size of about 200–5000 Å and an aspect ratio of at least 5:1. We have found that temperatures up to about 5° C. above the softening point of the glass can be successfully used to generate the desired silver halide particles. The use of temperatures higher than those described in U.S. Pat. No. 4,479,819 can reduce the time required for crystal generation. After the sample was placed therein, a period of about 30 minutes was allowed to pass to permit the furnace and sample to return to equilibrium. Thereafter, the furnace was purged with flowing nitrogen to remove any residual oxygen. The outlet valve, which was connected to a flare tube, was then closed and the furnace filled with hydrogen to a pressure of about 58 psig ($\approx 4$ atm). The outlet valve was thereafter opened a slight crack to allow a small flow of hydrogen gas, and a catalytic combustor was placed immediately contiguous to the flare tube to assure combustion of the hydrogen. After a predetermined period of time (clocked from the instant hydrogen was first admitted into the furnace) the outlet valve was opened to relieve the pressure, the furnace was purged with nitrogen for five minutes, and the furnace allowed to cool before the sample was removed therefrom.

In simulating the conventional (non-pressurized) firing step, after purging the furnace with nitrogen to remove residual oxygen, hydrogen was simply flowed through the furnace and out the flare tube into the catalytic combustor with essentially no pressure buildup, i.e., at essentially 0 psig.

Corning 8111 has a softening point of about 663° C., an annealing point of about 495° C., and a strain point of about 462° C. A temperature of about 730° C. ($\approx 67°$ C. above the softening point of the glass) was used to generate the silver halide particles.

The appended drawing illustrates the significant advantages in contrast and breadth of bandwidth which result from the present inventive method. Curve A illustrates contrast as a function of wavelength for a glass sample treated in accordance with the conventional practice; viz., hydrogen firing for four hours at 425° C. and 0 psig. Curves B, C, and D represent treatments applied to glass samples utilizing pressurized atmospheres. Thus, Curve B depicts contrast as a function of wavelength after a one hour firing at 425° C. under a hydrogen pressure of about 58 psig; Curve C after a four hour firing at 425° C. and a hydrogen pressure of about 58 psig; and Curve D after a seven hour firing at 425° C. and a hydrogen pressure of about 58 psig. It is immediately apparent that the use of a pressurized reducing atmosphere not only gives rise to a dramatic increase in contrast, but also leads to a tremendous broadening of the bandwidth of useful polarizing effect. And those effects are produced in a short span of exposure time. Hence, as can be seen, the one hour firing in the pressurized atmosphere yielded greater contrast and broader bandwidth than the four hour conventional treatment. This phenomenon is extremely important from a processing point of view inasmuch as processing times are much reduced which, in turn, result in considerable cost savings. With respect to bandwidth, after four hours in the pressurized atmosphere, the region of high contrast extends over a range of wavelengths at least 2000 Å, and commonly in excess of 3000 Å, whereas the sample fired in the conventional manner demonstrated a very narrow band on either side of a peak, with the contrast falling off sharply. In general, whereas an exposure time of as little as one hour can produce bandwidths and contrasts of greater magnitude than a four hour conventional treatment, to assure the development of a relatively broad bandwidth of high contrast polarizing properties, an exposure period of about two hours will be employed.

We claim:

1. A method for making a glass article exhibiting a relatively broad band of high contrast polarizing properties in the infrared region of the radiation spectrum from glasses which will be phase separable or will exhibit photochromic properties through the presence of silver halide particles therein selected from the group consisting of AgCl, AgBr, and AgI, which method comprises the steps of:
    (a) melting a batch for a glass containing silver and at least one halide selected from the group consisting of chloride, bromide, and iodide;
    (b) cooling and shaping said melt into a glass article of a desired configuration;
    (c) subjecting said glass article to a temperature at least above the strain point, but not in excess of 75° C. above the softening point of the glass, for a sufficient length of time to cause the generation of silver halide particles therein selected from the group consisting of AgCl, AgBr, and AgI, said particles ranging in size between about 200–5000 Å;
    (d) elongating said glass article under stress at a temperature above the annealing point, but below that where said glass exhibits a viscosity of about $10^8$ poises, such that said silver halide particles are elongated to an aspect ratio of at least 5:1 and aligned in the direction of the stress; and, thereafter, (e) exposing said elongated glass article to a reducing environment at a pressure at least one atmosphere greater than atmospheric pressure and at a temperature above about 250° C., but no higher than about 25° C. above the annealing point of the glass, for a period of time sufficient to develop a reducing surface layer on said glass article having a thickness of at least 10 microns wherein at least a portion of said elongated silver halide particles are reduced to elemental silver particles having aspect ratios greater than 2:1 which are deposited in and/or upon said elongated particles, whereby said glass article exhibiting a relatively broad range of high contrast polarizing properties in the infrared region of the radiation spectrum is formed.

2. A method according to claim 1 wherein said photochromic glass consists essentially, expressed in terms of weight percent on the oxide basis, of 6-20% $R_2O$, wherein $R_2O$ consists of 0-2.5% $Li_2O$, 0-9% $Na_2O$, 0-17% $K_2O$, and 0-6% $Cs_2O$, 14-23% $B_2O_3$, 5-25% $Al_2O_3$, 0-25% $P_2O_5$, 20-65% $SiO_2$, 0.004-0.02% CuO, 0.15-0.3% Ag, 0.1-0.25% Cl, and 0.1-0.2% Br, the molar ratio $R_2O:B_2O_3$ ranging between about 0.55-0.85, where the composition is essentially free from divalent metal oxides other than CuO, and the weight ratio Ag:(Cl+Br) ranging about 0.65-0.95.

3. A method according to claim 1 wherein said phase separable glass is essentially free from CuO and consists essentially, expressed in terms of weight percent on the oxide basis, of 6-20% $R_2O$, wherein $R_2O$ consists of 0-2.5% $Li_2O$, 0-9% $Na_2O$, 0-17% $K_2O$, and 0-6% $Cs_2O$, 14-23% $B_2O_3$, 5-25% $Al_2O_3$, 0-25% $P_2O_5$, 20-65% $SiO_2$, 0.15-0.3% Ag, 0.1-0.25% Cl, and 0.1-0.2% Br, the molar ratio $R_2O:B_2O_3$ ranging between about 0.55-0.85, where the composition is essentially free from divalent metal oxides, and the weight ratio Ag:(Cl+Br) ranging about 0.65-0.95.

4. A method according to claim 1 wherein said phase separable glass consists essentially, expressed in terms of weight percent on the oxide basis, of 6-20% $R_2O$, wherein $R_2O$ consists of 0-2.5% $Li_2O$, 0-9% $Na_2O$, 0-17% $K_2O$, and 0-6% $Cs_2O$, 14-23% $B_2O_3$, 5-25% $Al_2O_3$, 0-25% $P_2O_5$, 20-65% $SiO_2$, 0.004-0.02% CuO, 0.15-0.3% Ag, 0.1-0.25% Cl, and 0.1-0.2% Br, the molar ratio $R_2O:B_2O_3$ ranging about 0.55-0.85, where the composition is essentially free from divalent metal oxides other than CuO, the weight ratio Ag:(Cl+Br) ranging about 0.65-0.95, and the molar ratio $(R_2O-Al_2O_3):B_2O_3 < 0.25$.

5. A method according to claim 1 wherein said phase separable glass contains silver halide particles and copper and consists essentially, expressed in terms of weight percent on the oxide basis, of about 5-12% alkali metal oxides, 27-35% $B_2O_3$, 1-15% $Al_2O_3$, and the remainder $SiO_2$.

6. A method according to claim 5 wherein said glass consists essentially, expressed in terms of weight percent on the oxide basis, of

| $SiO_2$ | 51.8 | $Na_2O$ | 9.8 | Br | 1.2 |
|---|---|---|---|---|---|
| $B_2O_3$ | 31.0 | Ag | 0.18 | F | 1.2 |
| $Al_2O_3$ | 7.8 | Cl | 0.52 | CuO | 0.03. |

7. A method according to claim 1 wherein said photochromic glass contains silver halide particles and copper and consists essentially, expressed in terms of weight percent on the oxide basis, of about 5-12% alkali metal oxides, 27-35% $B_2O_3$, 1-15% $Al_2O_3$, at least 0.01% CdO, and the remainder $SiO_2$.

8. A method according to claim 1 wherein said band of polarizing properties extends over a range of wavelengths of at least 2000Å.

9. A method according to claim 1 wherein said reducing environment consists of a hydrogen-containing atmosphere.

10. A method according to claim 9 wherein said period of time sufficient to develop a reducing surface layer on said glass article is at least two hours.

* * * * *